United States Patent [19]

Ferguson

[11] Patent Number: 4,881,342

[45] Date of Patent: Nov. 21, 1989

[54] PLANT SUPPORT DEVICE AND DISPLAY STAND THEREFOR

[76] Inventor: George W. Ferguson, 981 W. 99th Ave., Northglenn, Colo. 80021

[21] Appl. No.: 145,257

[22] Filed: Jan. 19, 1988

[51] Int. Cl.$^4$ ............................................. A01G 17/14
[52] U.S. Cl. .................................... 47/47; 47/41.13; 248/125
[58] Field of Search ................... 47/44, 46, 47, 41.13, 47/70; 248/122, 125, 304, 307

[56] References Cited

U.S. PATENT DOCUMENTS

| | | | |
|---|---|---|---|
| 184,064 | 11/1876 | Daul | 47/47 |
| 548,508 | 10/1895 | Bjelland | 47/47 |
| 687,283 | 11/1901 | Springer et al. | 47/47 |
| 730,779 | 6/1903 | Lacy | 248/125 X |
| 879,047 | 2/1908 | Heubner et al. | 47/47 |
| 1,911,979 | 5/1933 | Vaars et al. | 47/47 |
| 2,124,049 | 7/1938 | Battista et al. | 47/47 |
| 2,134,242 | 10/1938 | Wade | 47/47 |
| 2,174,955 | 10/1939 | Wade | 47/47 |
| 2,229,935 | 1/1941 | Powers | 47/44 X |
| 2,851,823 | 9/1958 | Peterson | 47/47 |
| 3,061,976 | 11/1962 | Carroll et al. | 47/47 |
| 3,302,328 | 2/1967 | King | 47/47 |
| 3,778,929 | 12/1973 | Pearson | 47/58 |
| 4,128,965 | 12/1978 | D'Hondt | 47/47 |
| 4,333,264 | 6/1982 | Smrt | 47/42 |

FOREIGN PATENT DOCUMENTS

| | | | |
|---|---|---|---|
| 102600 | 12/1965 | Denmark | 47/44 UX |
| 253647 | 10/1911 | Fed. Rep. of Germany | 47/44 UX |
| 2433900 | 3/1980 | France | 47/44 |
| 328438 | 5/1930 | United Kingdom | 47/47 UX |
| 1273231 | 5/1972 | United Kingdom | 47/44 UX |

Primary Examiner—Robert A. Hafer
Assistant Examiner—Sam Rimell
Attorney, Agent, or Firm—John E. Reilly

[57] ABSTRACT

A plant support device for controlling the vertical growth of a plant includes a standard placed in the soil adjacent to the plant and a plurality of stem support members adjustably disposed on the standard, each stem support member having a generally hook-shaped end portion to receive one of the stems of a plant, or pairs of support members may be interconnected such that opposite hook-shaped ends are engageable with the standard and one of the stems of the plant.

5 Claims, 1 Drawing Sheet

U.S. Patent
Nov. 21, 1989
4,881,342
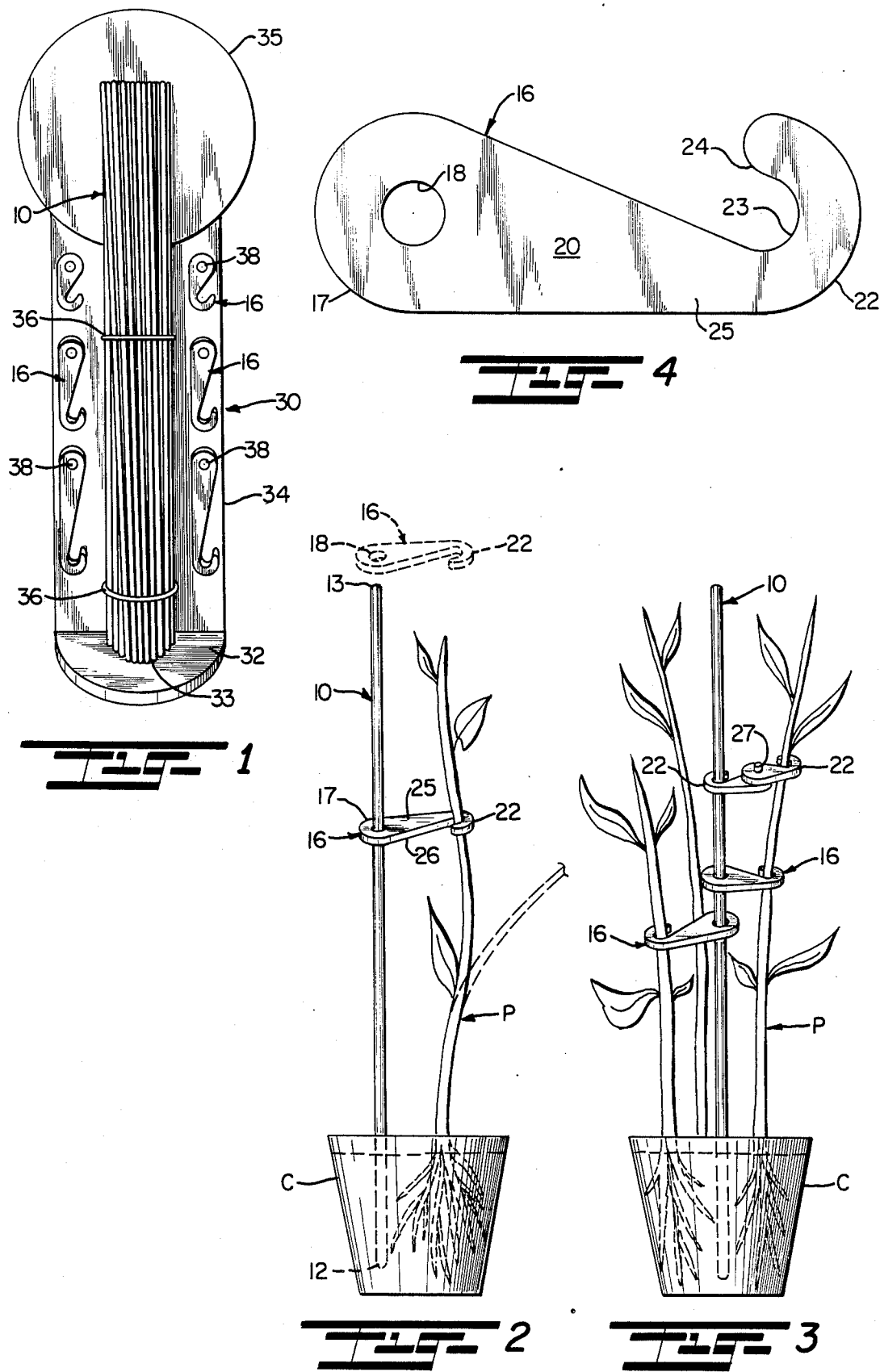

PLANT SUPPORT DEVICE AND DISPLAY STAND THEREFOR

This invention relates to plant support applications; and more particularly relates to a novel and improved plant support device which is specifically adapted for controlling the vertical growth of a plant and which is conformable for use with different sized plants.

BACKGROUND AND FIELD OF THE INVENTION

Numerous types of plant supports have been devised in which a standard is forced into the soil and one or more loops or guide members on the standard will encircle stems of the plant so as to encourage growth of the plant stems in a particular direction. For example, in U.S. Pat. No. 1,124,049 to J. J. Battista et al a stake is provided from which support members are adjustably clipped at different locations along the stake for the purpose of supporting plant stems. A similar approach is disclosed in U.S. Pat. No. 879,047 to H. Heubner et al. Other patents illustrate various types of stake or rod attachments, such as, U.S. Pat. Nos. 548,508 to O. C. Bjelland; 687,283 to W. F. Springer et al; 2,851,823 to C. C. Peterson as well as 3,061,976 to J. J. Carroll et al and 3,302,328 to W. E. King. Another patent of general interest in this field in U.S. Pat. No. 1,911,979 to H. J. Varrs, Jr. et al which discloses a metal rod standard having wire bent into helical springs to slide frictionally on the standard with outer ends of the springs being formed to encircle the stems of the plant.

A disclosure document dated Jan. 7, 1987, was filed by inventor George W. Ferguson in the U.S. Patent and Trademark Office under No. 161,82, relating to the invention of this application.

The purpose of the present invention is to offer controlled vertical growth for plants that would otherwise grow in an undesirable manner and which offers additional advantages of being conformable for different sized indoor and outdoorplants, tree saplings, flowering shrubs and bushes.

SUMMARY OF THE INVENTION

Accordingly an object of the present invention is to provide for a novel and improved plant support which is of simplified construction and can be easily assembled.

It is another object of the present invention to provide for a novel and improved plant support which is conformable for use with a variety of different sized plants to control plant growth in a dependable manner and in such a way as to lessen the possibility of damage to the plant stems.

It is a further object of the present invention to provide for a novel and improved display stand for a series of plant supports of different sizes and lengths according to the plant size to be supported and wherein each plant support element is readily adjustable as the plant continues to grow.

A still further object of the present invention is to provide for a novel and improved versatile plant support device in which support elements offer broad surfaces for plant stem support, the support elements being adjustable in length and having varied sized openings to best conform to the diameter of the stem to be supported while further being readily adjustable along the central standard to support plants of varied sizes, the device being rustproof, simple and inexpensive to construct, durable and efficient in use while readily blending into plant decor.

In accordance with the present invention, there has been devised a novel and improved plant support device in which a standard is insertable into the soil at the base of a growing plant for upward extension along the center of the plant, and a plurality of plant stem support members are disposed in vertically spaced relation on said standard, each of the support members being of elongated configuration with a generally hook-shaped portion at a free end of each stem support member into which a stem of the plant is inserted. Most desirably, each of the stem support members has a bore at one end for slidable movement along the standard to a desired position with a thickened end surrounding the bore which tapers outwardly and converges into a generally semicircular hook-shaped end portion into which a stem is inserted. The stem support members are rotatable on the standard that they are free to extend in different directions from different locations on the standard to engage an individual stem and encourage its controlled growth in a predetermined direction without in any way binding or clamping the stem. Preferably, the standard and support members are composed of wood with the support members being of different lengths as well as being interconnectable to effectively double their length when desired.

Other objects, advantages and features of the present invention will become more readily appreciated and understood when taken together with the following detailed description in conjunction wih the accompanying drawings, in which:

BRIEF DESCRIPTION OF THE DRAWINGS

FIG. 1 is a front view in elevation of a display stand containing parts of a preferred embodiment of plant support device in accordance with the present invention;

FIG. 2 illustrates a preferred form of plant support device and its manner of assembly to a growing plant;

FIG. 3 is another view illustrating the assembly of a preferred form of plant support device with respect to a growing plant; and FIG. 4 is a plan view of a preferred form of stem support member forming a part of the plant support device of the present invention.

DETAILED DESCRIPTION OF THE PREFERRED EMBODIMENT

Referring in more detail to the drawings, there is illustrated in FIGS. 2 to 4 a preferred form of plant support device which is made up of a standard or elongated support peg 10 of uniform diameter throughout its substantial length except for a tapered end 12 and a chamfered or rounded end 13. A plurality of stem support members 16 are adapted to be positioned on the standard 10, each member 16 being an elongated flat rigid member with a relatively thick, rounded end 17 provided with a bore 18 at one end which is sized for insertion of the standard therethrough. Main body portion 20 of the member 16 is tapered in width from the thickened end 17 toward a generally hook-shaped end portion 22, the hook-shaped end 22 being generally semi-circular to form an open slot 23 having an entrance 24 facing somewhat rearwardly or inwardly toward the rounded or inner end of the slot 23, the slot extending at an acute angle to the length of the support member.

Each support member 16 is further characterized by having a flat upper surface 25 and bottom surface 26 parallel to the upper surface, the body 20 being of uniform thickness throughout and preferably composed of a wood or plastic material.

As best seen from a consideration of FIGS. 2 and 3, the tapered end 12 of the standard 10 is inserted into the soil of a potted plant container as represented at C for a plant P and is inserted to a sufficient depth to be self-supporting in the soil. An appropriate sized hook or support member 16 is placed on the standard by advancing the bore 18 over the standard and to the desired height along the standard to best suit the stem to be adjusted. The stem is gently placed into the slot 23 at the hook-shaped end with the hook disposed in the same attitude as the stem is leaning. As best seen from FIG. 3, any number of support members 16 may be positioned at different heights for extension in different directions away from the standard for engagement with a particular stem and essentially to maintain vertical controlled growth of each stem. Again, hooks of different sizes and lengths may be employed according to the number of stems to be trained or supported.

As shown in FIG. 1, a plurality of standard 10 and support members 16 are mounted on a display stand 30 which is comprised of a base plate 32 of generally semi-circular configuration having a semi-circular opening 33 so as to form a base plate of somewhat annular configuration. An upright panel 34 extends from the straight edge of the base plate and has an upper rounded or circular end portion 35. The standards 10 are mounted on the upright panel with their lower tapered ends 12 inserted into the opening 33 and are retained centrally of the panel 34 by means of suitable retainer bands 36. Hooks or support members 16 of different sizes are placed on support pegs 38 arranged in vertically spaced relation along the upright panel 34 on opposite sides of the standards 10.

The display stand as described offers a convenient, compact means of packaging and selling the plant support assemblies, permitting selection of the desired size standard 10 and support member 16 according to the size of the stem to be supported. The construction of the hook-shaped support member 16 permits their use in combination, for example, where additional length is needed for larger plants. To this end, a pair of support members 16 may be connected by passing a common support pin or dowel 27 through aligned bores 18 such that the hook ends 22 extend in opposite directions from one another. One of the hook ends 22 is placed over the standard, and the opposite hook end 22 receives the stem to be supported. It will be appreciated that different sized support members 16 may be used in combination to achieve the desired length of support member.

In the preferred form, both the standards 10 and support members 16 are formed out of wood and are of simple construction for ease of assembly. Further, the elements are constructed in a variety of sizes, small, medium and large to accommodate different sized plants. The design of the hook end portion 22 lessens any chance of damage to the plant or tree which is often caused by the use of wires or twist ties. Moreover, the configuration of the hook end 22 will easily adjust to the increased size of the stems as they continue to grow.

It is therefore to be understood from the foregoing that various other modifications and changes may be made in the construction and arrangement of parts comprising the preferred embodiment of invention as described without departing from the spirit and scope thereof as defined by the appended claims:

I claim:

1. In a plant support device wherein a standard is inserted into the soil at the base of a growing plant for upward extension from the soil along the center portion of the plant, the improvement comprising:

a plurality of plant stem support members disposed in vertically spaced relation to one another on said standard, each said support member extending radially outward from said standard and having a hook shaped end portion at a free end of said support member into which a stem of said growing plant is inserted, each said support member having a thickened end in surrounding relation to said standard and tapering away from said thickened end into said hook shaped end portion, said thickened end and said hook shaped end portion joined by a straight wall portion, said hook shaped end portion defined by opposing walls, said opposing walls oriented at an acute angle to said straight wall, and support means at one end of said support member, said support means and said hook shaped end portion provided with correspondingly sized openings to interchangeably receive said standard.

2. In a plant support device according to claim 1, each said suport means having a bore at one end sized to receive said standard, said support member being slidable vertically along said standard.

3. In a plant support device according to claim 1, each said support member having flat top and bottom surfaces and including a body portion of elongated configuration tapering into said hook-shaped portion.

4. In a plant support device according to claim 1, each said support member being composed of wood including a bore at one end and a generally semi-circular hook-shaped portion at an opposite end thereof, said support member being of elongated configuration tapering in width from said one end to the opposite end thereof.

5. In a plant device according to claim 1, including a pair of said support members connected in end-to-end relation to one another having hook-shaped portions at opposite ends thereof, one of said hook-shaped portions mounted on said standard and the other of said hook-shaped portions receiving the stem of a plant therein.

* * * * *

UNITED STATES PATENT AND TRADEMARK OFFICE
CERTIFICATE OF CORRECTION

PATENT NO. : 4,881,342

DATED : November 21, 1989

INVENTOR(S) : Ferguson, George W.

It is certified that error appears in the above-identified patent and that said Letters Patent is hereby corrected as shown below:

Column 1, line 35 cancel "161,82" and substitute --161,882--.

Column 3, line 24, cancel "standard" and substitute --standards--

Signed and Sealed this

Twenty-third Day of October, 1990

Attest:

HARRY F. MANBECK, JR.

Attesting Officer

Commissioner of Patents and Trademarks